United States Patent
Ishikawa et al.

(10) Patent No.: US 9,813,273 B2
(45) Date of Patent: Nov. 7, 2017

(54) PEAK SUPPRESSION DEVICE

(71) Applicant: FUJITSU LIMITED, Kawasaki-shi, Kanagawa (JP)

(72) Inventors: Hiroyoshi Ishikawa, Kawasaki (JP); Toshio Kawasaki, Kawasaki (JP); Hikaru Ishikawa, Kawasaki (JP); Kazuo Nagatani, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/862,557

(22) Filed: Sep. 23, 2015

(65) Prior Publication Data

US 2016/0119172 A1 Apr. 28, 2016

(30) Foreign Application Priority Data

Oct. 22, 2014 (JP) .................................. 2014-215602

(51) Int. Cl.
*H04L 27/26* (2006.01)
*H04L 25/03* (2006.01)
*H04L 25/49* (2006.01)

(52) U.S. Cl.
CPC .... *H04L 27/2624* (2013.01); *H04L 25/03834* (2013.01); *H04B 2201/70706* (2013.01)

(58) Field of Classification Search
CPC ........... H04L 27/2614; H04L 25/03834; H04L 27/0008; H04L 27/2624; H04B 2201/70706

See application file for complete search history.

(56) References Cited

U.S. PATENT DOCUMENTS

| | | | |
|---|---|---|---|
| 6,522,869 B1* | 2/2003 | Hiramatsu | H04L 27/2623 455/127.2 |
| 9,331,882 B2* | 5/2016 | Fehri | H04L 27/2623 |
| 2006/0171326 A1* | 8/2006 | Durand | H04L 1/0001 370/252 |
| 2008/0043869 A1* | 2/2008 | Hamada | H03F 1/32 375/260 |
| 2009/0225898 A1* | 9/2009 | Abe | H04B 1/707 375/296 |
| 2010/0148828 A1* | 6/2010 | Nagatani | H04L 27/2623 327/105 |
| 2011/0249768 A1 | 10/2011 | Kuwabara | |
| 2014/0241462 A1* | 8/2014 | Bellaouar | H03F 1/3241 375/297 |
| 2015/0123735 A1* | 5/2015 | Wimpenny | H03F 3/211 330/295 |

FOREIGN PATENT DOCUMENTS

| | | |
|---|---|---|
| JP | 2002-305489 | 10/2002 |
| JP | 2014-027343 | 2/2014 |
| WO | 2010-061914 | 6/2010 |

* cited by examiner

*Primary Examiner* — Michelle M Koeth
(74) *Attorney, Agent, or Firm* — Fujitsu Patent Center

(57) ABSTRACT

A peak suppression device includes an acquiring unit that acquires multiple envelopes of carrier signals that are included in a multicarrier signal, an adding unit that adds the envelopes to generate a combined envelope, a detecting unit that detects a peak value and a peak timing of the multicarrier signal by using the combined envelope, and a suppressing unit that suppresses a peak of the multicarrier signal in accordance with the peak value and the peak timing.

1 Claim, 9 Drawing Sheets

PEAK SUPPRESSION DEVICE

CROSS-REFERENCE TO RELATED APPLICATION

This application is based upon and claims the benefit of priority of the prior Japanese Patent Application No. 2014-215602, filed on Oct. 22, 2014, the entire contents of which are incorporated herein by reference.

FIELD

The embodiments discussed herein are related to a peak suppression device.

BACKGROUND

A radio transmission device of a wireless communication system includes a power amplifier (hereafter, sometimes referred to as a "PA") that amplifies the power of transmission signals. In the radio transmission device, the PA is usually operated near the saturation range of the PA in order to improve the power efficiency of the PA.

Furthermore, in recent years, in order to improve the spectral efficiency, a signal that is transmitted from the radio transmission device is sometimes a "multicarrier signal" that includes signals with multiple different carrier frequencies. Hereafter, a signal with each carrier frequency, which is included in a multicarrier signal, is sometimes referred to as a "carrier signal". That is, a multicarrier signal includes multiple carrier signals. Examples of the multicarrier signal include an orthogonal frequency division multiplexing (OFDM) signal.

However, the peak-to-average power ratio (PAPR) of multicarrier signals tends to increase. Therefore, if a multicarrier signal is input to the PA that is operated near the saturation range, the waveform of the signal that is output from the PA is distorted due to the effect of the non-linear distortion of the PA.

Therefore, in the radio transmission device that transmits a multicarrier signal, "peak suppression" is conducted so that the peak amplitude (hereafter, sometimes simply referred to as the "peak") of a multicarrier signal, which is to be input to the PA, is previously suppressed before it is input to the PA.

According to one of the techniques for peak suppression, as illustrated in FIG. 1, a suppression signal is applied to a multicarrier signal in synchronization with the timing (hereafter, sometimes referred to as the "peak timing") in which the peak occurs in the amplitude waveform of the multicarrier signal. A subtraction amount that is a negative addition amount, i.e., a suppression amount, is determined from the difference between the peak value and the target value. Furthermore, an impulse response signal that has a signal component in the same frequency band as that of a transmission signal is used as a suppression signal. Thus, the peak of a multicarrier signal is suppressed to the target value, and therefore the linearity of signals that are output from the PA can be maintained. FIG. 1 is a diagram that illustrates an example of the peak suppression.

Examples of related-art are described in Japanese Laid-open Patent Publication No. 2014-027343, and in International Publication Pamphlet No. WO 2010/061914

Here, if the interval (hereafter, sometimes referred to as the "carrier interval") between two adjacent carriers of a multicarrier signal is large, a small amplitude fluctuation of the multicarrier signal in the direction of the time axis is sharp, as illustrated in FIG. 2. Therefore, if the carrier interval is large, multiple peaks, e.g., eight peaks, that exceed the target value are sometimes detected within a short time range. FIG. 2 is a diagram that illustrates the problem.

With regard to the above, if impulse response signals are applied to the multicarrier signal in synchronization with the eight peaks, the peak is largely decreased with respect to the target value, i.e., the peak is suppressed too much. Therefore, it is preferable that, if multiple peaks that exceed the target value are detected within a short time range, the timing for applying an impulse response signal is determined to be one of the peak timings that correspond to the peaks. However, to determine the single optimum timing for applying an impulse response signal among multiple peak timings in accordance with various amplitude patterns of a multicarrier signal, processing is complicated, and the size of the circuit of the radio transmission device becomes large.

SUMMARY

According to an aspect of an embodiment, a peak suppression device includes an acquiring unit that acquires multiple envelopes of carrier signals that are included in a multicarrier signal, an adding unit that adds the envelopes to generate a combined envelope, a detecting unit that detects a peak value and a peak timing of the multicarrier signal by using the combined envelope, and a suppressing unit that suppresses a peak of the multicarrier signal in accordance with the peak value and the peak timing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
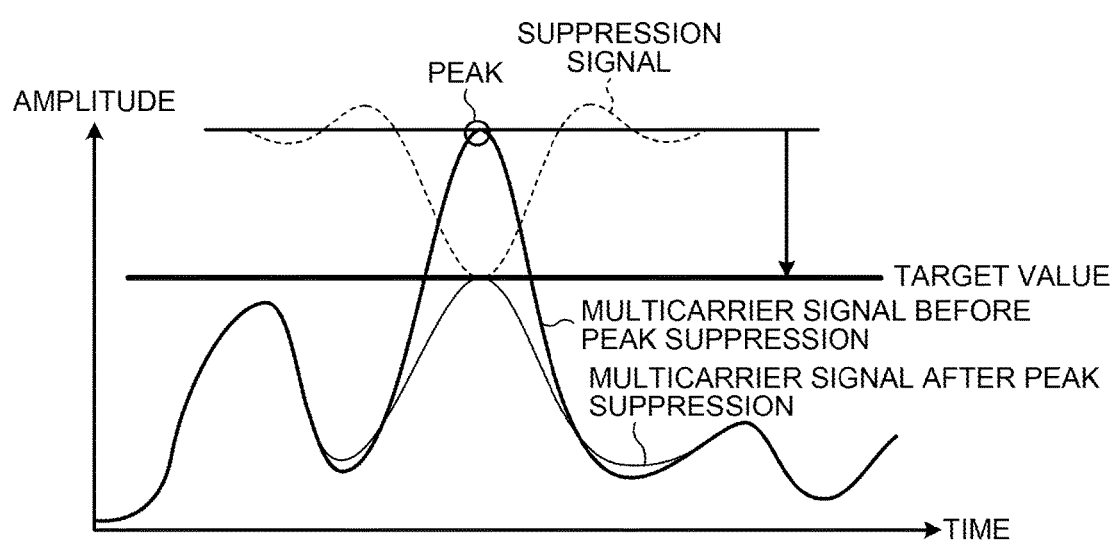
FIG. 1 is a diagram that illustrates an example of peak suppression.

Preferred embodiments of the present invention will be explained with reference to accompanying drawings. Here, the peak suppression device that is disclosed in the present application is not limited to the embodiment. Furthermore, in embodiments, the same reference numerals are applied to the components that have the same functionality, and duplicated explanations are omitted.

[a] First Embodiment

Configuration of a Radio Transmission Device

Figure 3:
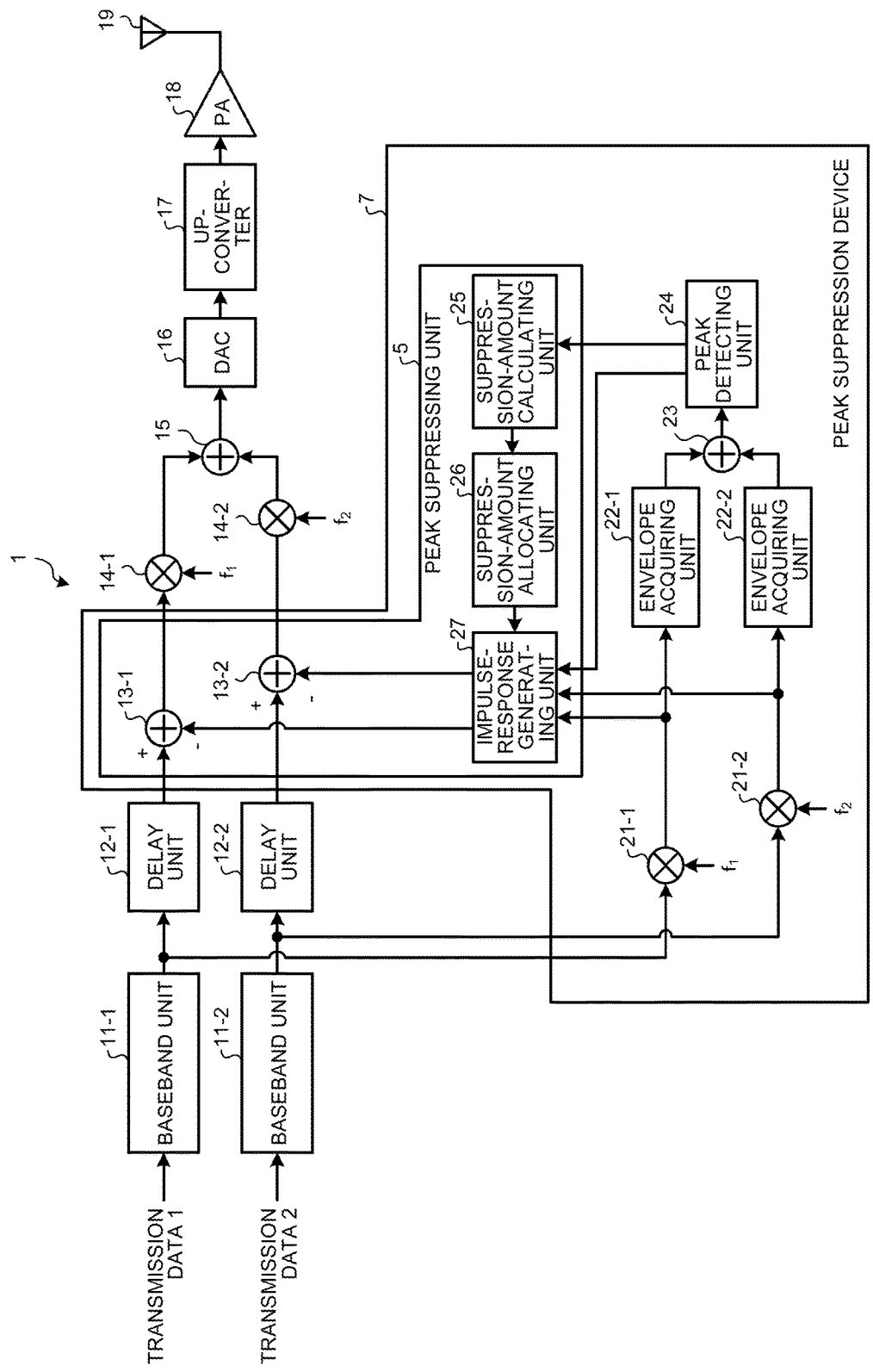
FIG. 3 is a block diagram that illustrates an example of the configuration of a radio transmission device according to a first embodiment.

FIG. 3 is a block diagram that illustrates an example of the configuration of a radio transmission device according to a first embodiment. In FIG. 3, a radio transmission device 1 includes baseband units 11-1 and 11-2, delay units 12-1 and 12-2, a peak suppression device 7, frequency shifters 14-1 and 14-2, an adding unit 15, and a digital-to-analog converter (DAC) 16. Furthermore, the radio transmission device 1 includes an up-converter 17, a PA 18, and an antenna 19.

The peak suppression device 7 includes frequency shifters 21-1 and 21-2, envelope acquiring units 22-1 and 22-2, an adding unit 23, a peak detecting unit 24, and a peak suppressing unit 5.

The peak suppressing unit 5 includes a suppression-amount calculating unit 25, a suppression-amount allocating unit 26, an impulse-response generating unit 27, and subtracting units 13-1 and 13-2.

The baseband unit 11-1 performs baseband processing, such as encoding processing and modulation processing, on input transmission data 1 to generate a transmission baseband signal B1 and outputs the generated transmission baseband signal B1 to the delay unit 12-1 and the frequency shifter 21-1. The baseband unit 11-2 performs baseband processing, such as encoding processing and modulation processing, on input transmission data 2 to generate a transmission baseband signal B2 and outputs the generated transmission baseband signal B2 to the delay unit 12-2 and the frequency shifter 21-2.

Here, the transmission data 1 is the data that is allocated to a carrier frequency $f_1$ of a multicarrier signal, and the transmission data 2 is the data that is allocated to a carrier frequency $f_2$ of a multicarrier signal. That is, the radio transmission device 1 generates a multicarrier signal that includes multiple signals with the carrier frequencies $f_1$ and $f_2$ that are different from each other.

Figure 4:
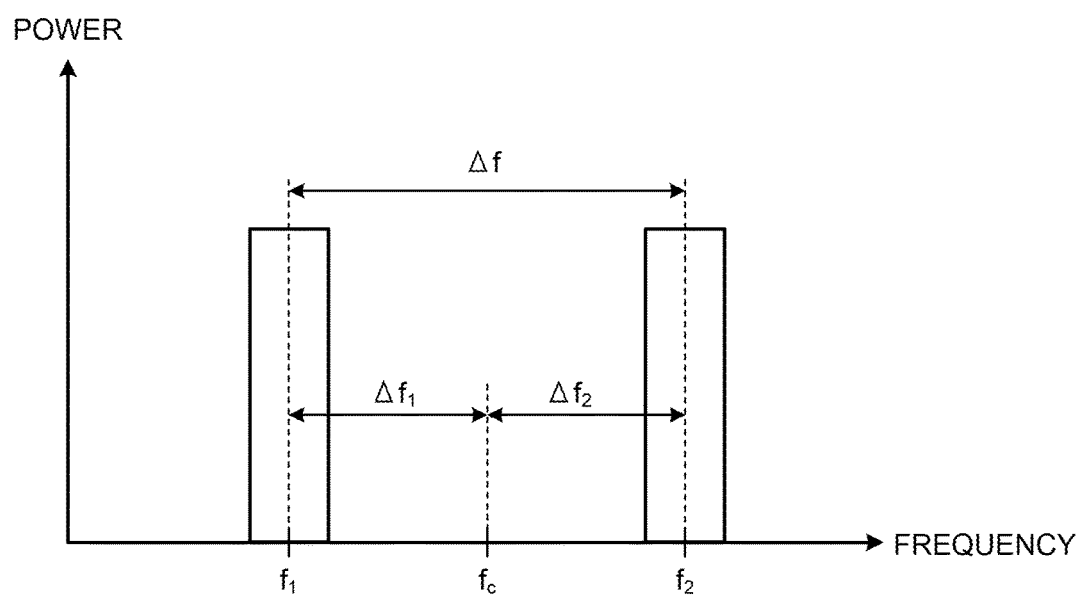
FIG. 4 is a diagram that illustrates an example of a multicarrier signal according to the first embodiment.

FIG. 4 is a diagram that illustrates an example of the multicarrier signal according to the first embodiment. As illustrated in FIG. 4, the multicarrier signal includes, for example, two carriers, i.e., the carrier $f_1$ with the frequency $f_1$ and the carrier $f_2$ with the frequency $f_2$. The carrier $f_1$ and the carrier $f_2$ are adjacent to each other with a carrier interval $\Delta f$, the carrier $f_1$ is shifted to a position by $\Delta f_1$ from a center frequency $f_c$, and the carrier $f_2$ is shifted to a position by $\Delta f_2$ from the center frequency $f_c$.

In FIG. 3, the delay unit 12-1 delays the transmission baseband signal B1 by a delay amount D and outputs the delayed transmission baseband signal B1 to the subtracting unit 13-1. The delay unit 12-2 delays the transmission baseband signal B2 by the delay amount D and outputs the delayed transmission baseband signal B2 to the subtracting unit 13-2. Here, the total processing delay amount by the frequency shifters 21-1 and 21-2, the envelope acquiring units 22-1 and 22-2, the adding unit 23, the peak detecting unit 24, the suppression-amount calculating unit 25, the suppression-amount allocating unit 26, and the impulse-response generating unit 27 is "D".

The subtracting unit 13-1 subtracts an impulse response signal, which is input from the impulse-response generating unit 27, from the delayed transmission baseband signal B1 to conduct peak suppression on the transmission baseband signal B1 and outputs a peak-suppressed transmission baseband signal B1' to the frequency shifter 14-1. The subtracting unit 13-2 subtracts an impulse response signal, which is input from the impulse-response generating unit 27, from the delayed transmission baseband signal B2 to conduct peak suppression on the transmission baseband signal B2 and outputs a peak-suppressed transmission baseband signal B2' to the frequency shifter 14-2.

The frequency shifter 14-1 multiplies the peak-suppressed transmission baseband signal B1' by the carrier frequency $f_1$ to generate a peak-suppressed carrier signal C1' and outputs the generated carrier signal C1' to the adding unit 15. The frequency shifter 14-2 multiplies the peak-suppressed transmission baseband signal B2' by the carrier frequency $f_2$ to generate a peak-suppressed carrier signal C2' and outputs the generated carrier signal C2' to the adding unit 15.

The adding unit 15 adds the carrier signal C1' and the carrier signal C2' to combine them and outputs a combined signal CB to the DAC 16 after addition. Thus, the combined signal CB, which is output from the adding unit 15, is the multicarrier signal that is the combination of the signal that is obtained by suppressing the peak of a carrier signal C1 with the carrier frequency $f_1$ and the signal that is obtained by suppressing the peak of a carrier signal C2 with the carrier frequency $f_2$. That is, the combined signal CB that is output from the adding unit 15 is the multicarrier signal with the peak suppressed.

The DAC 16 converts a peak-suppressed multicarrier signal from a digital signal into an analog signal and outputs it to the up-converter 17.

The up-converter 17 up-converts an analog multicarrier signal and outputs the up-converted multicarrier signal to the PA 18.

The PA 18 amplifies the power of the up-converted multicarrier signal and outputs the power-amplified multicarrier signal to the antenna 19.

The antenna 19 wirelessly transmits the power-amplified multicarrier signal.

The frequency shifter 21-1 multiplies the transmission baseband signal B1 by the carrier frequency $f_1$ to generate the carrier signal C1 with the frequency $f_1$ and outputs the generated carrier signal C1 to the envelope acquiring unit 22-1 and the impulse-response generating unit 27. The frequency shifter 21-2 multiplies the transmission baseband signal B2 by the carrier frequency $f_2$ to generate the carrier signal C2 with the frequency $f_2$ and outputs the generated carrier signal C2 to the envelope acquiring unit 22-2 and the impulse-response generating unit 27.

Each of the envelope acquiring units 22-1 and 22-2 acquires a signal that indicates the amplitude waveform of a carrier signal, i.e., the envelope of a carrier signal. Specifically, the envelope acquiring unit 22-1 acquires an envelope EN1 of the carrier signal C1 and outputs the acquired envelope EN1 to the adding unit 23. The envelope acquiring unit 22-2 acquires an envelope EN2 of the carrier signal C2 and outputs the acquired envelope EN2 to the adding unit 23.

The adding unit 23 adds the envelope EN1 and the envelope EN2 to combine them and then outputs a combined envelope EN0 to the peak detecting unit 24 after addition.

The peak detecting unit 24 uses the combined envelope EN0 as a signal (hereinafter, sometimes referred to as a "peak-detection signal") for detecting the peak of a multicarrier signal to detect the peak value and the peak timing of the multicarrier signal. The peak detecting unit 24 outputs the detected peak value to the suppression-amount calculating unit 25 and outputs the detected peak timing to the impulse-response generating unit 27.

The peak suppressing unit 5 suppresses the peak of the multicarrier signal as described below on the basis of the peak value and the peak timing that are input from the peak detecting unit 24.

Specifically, the suppression-amount calculating unit 25 calculates the difference between the peak value and the target value as a suppression amount SU0 with regard to the peak of the multicarrier signal and outputs the calculated suppression amount SU0 to the suppression-amount allocating unit 26.

The suppression-amount allocating unit 26 calculates the value that is one-half of the suppression amount SU0, which is calculated by the suppression-amount calculating unit 25, as a suppression amount SU1 with regard to the carrier signal C1 and a suppression amount SU2 with regard to the carrier signal C2 and outputs the calculated suppression amounts SU1 and SU2 to the impulse-response generating unit 27. That is, the suppression-amount allocating unit 26 evenly allocates the suppression amount that is one-half of the suppression amount SU0 to the carrier signal C1 and the carrier signal C2.

The impulse-response generating unit 27 generates an impulse response signal IM1 that has the maximum amplitude that is equivalent to the suppression amount SU1, which is input from the suppression-amount allocating unit 26, at the peak timing that is input from the peak detecting unit 24 and outputs it to the subtracting unit 13-1. Furthermore, the impulse-response generating unit 27 generates an impulse response signal IM2 that has the maximum amplitude that is equivalent to the suppression amount SU2, which is input from the suppression-amount allocating unit 26, at the peak timing that is input from the peak detecting unit 24 and outputs it to the subtracting unit 13-2. That is, the impulse-response generating unit 27 outputs, as suppression signals to the subtracting units 13-1 and 13-2, the impulse response signals IM1 and IM2 that have, as the maximum amplitude, the value that is one-half of the difference between the peak value and the target value in synchronization with the peak timing. Furthermore, here, the impulse-response generating unit 27 matches the phase of the impulse response signal IM1 with the phase of the carrier signal C1 and matches the phase of the impulse response signal IM2 with the phase of the carrier signal C2.

Furthermore, as described above, the subtracting unit 13-1 subtracts the impulse response signal IM1, which is input from the impulse-response generating unit 27, from the delayed transmission baseband signal B1, thereby conducting the peak suppression on the transmission baseband signal B1. Moreover, the subtracting unit 13-2 subtracts the impulse response signal IM2, which is input from the impulse-response generating unit 27, from the delayed transmission baseband signal B2, thereby conducting the peak suppression on the transmission baseband signal B2.

Operation of the Radio Transmission Device

Figure 5:
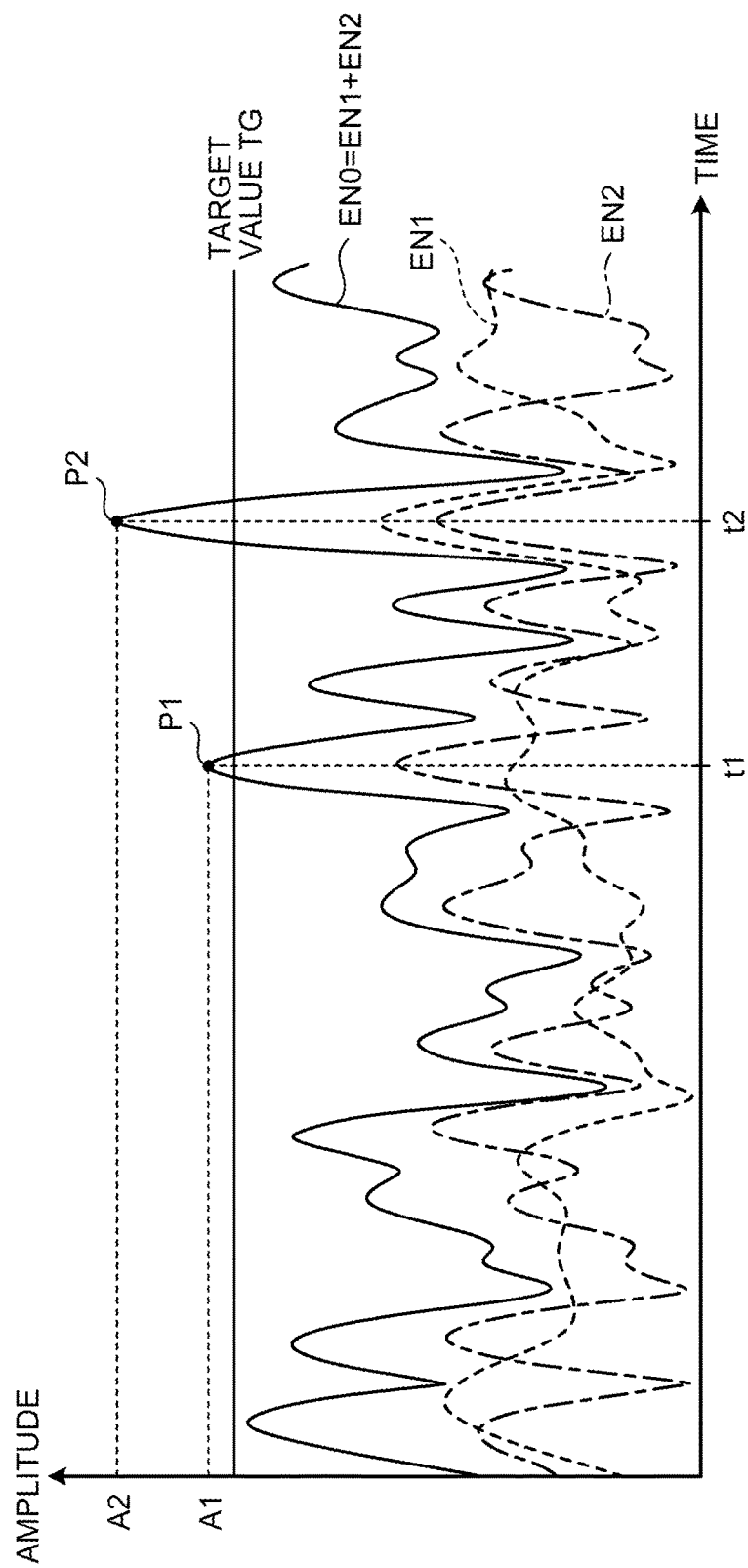
FIG. 5 is a diagram that illustrates an operation of the radio transmission device according to the first embodiment.

FIG. 5 is a diagram that illustrates an operation of the radio transmission device according to the first embodiment.

The envelope acquiring unit 22-1 acquires the envelope EN1 of the carrier signal C1 that is input from the frequency shifter 21-1.

The envelope acquiring unit 22-2 acquires the envelope EN2 of the carrier signal C2 that is input from the frequency shifter 21-2.

The adding unit 23 adds the envelope EN1 and the envelope EN2 to generate the combined envelope EN0.

The peak detecting unit 24 uses the combined envelope EN0 as a peak-detection signal to detect peaks P1 and P2 that exceed a target value TG with regard to the combined envelope EN0, a peak timing t1 of the peak P1, and a peak timing t2 of the peak P2. Furthermore, the peak detecting unit 24 detects a peak value A1 of the peak P1 and a peak value A2 of the peak P2.

The suppression-amount calculating unit 25 calculates "A1−TG" as a suppression amount SU0-1 at the peak timing t1. Furthermore, the suppression-amount calculating unit 25 calculates "A2−TG" as a suppression amount SU0-2 at the peak timing t2.

The suppression-amount allocating unit 26 calculates "(A1−TG)/2" as suppression amounts SU1-1 and SU2-1 at the peak timing t1. Furthermore, the suppression-amount allocating unit 26 calculates "(A2−TG)/2" as suppression amounts SU1-2 and SU2-2 at the peak timing t2.

The impulse-response generating unit 27 generates impulse response signals IM1-1 and IM2-1 that have SU1-1 and SU2-1 as the maximum amplitudes at the peak timing t1. Then, at the peak timing t1, the impulse-response generating unit 27 outputs the impulse response signal IM1-1 to the subtracting unit 13-1 and outputs the impulse response signal IM2-1 to the subtracting unit 13-2.

Furthermore, the impulse-response generating unit 27 generates impulse response signals IM1-2 and IM2-2 that have SU1-2 and SU2-2 as the maximum amplitudes at the peak timing t2. Then, at the peak timing t2, the impulse-response generating unit 27 outputs the impulse response signal IM1-2 to the subtracting unit 13-1 and outputs the impulse response signal IM2-2 to the subtracting unit 13-2.

Thus, in synchronization with the peak timing t1, the subtracting unit 13-1 subtracts the impulse response signal IM1-1 from the transmission baseband signal B1, and the subtracting unit 13-2 subtracts the impulse response signal IM2-1 from the transmission baseband signal B2. At the peak timing t1, the maximum amplitude of each of the impulse response signals IM1-1 and IM2-1 is "(A1−TG)/2".

In the same manner, in synchronization with the peak timing t2, the subtracting unit 13-1 subtracts the impulse response signal IM1-2 from the transmission baseband signal B1, and the subtracting unit 13-2 subtracts the impulse response signal IM2-2 from the transmission baseband signal B2. At the peak timing t2, the maximum amplitude of each of the impulse response signals IM1-2 and IM2-2 is "(A2−TG)/2".

Thus, each of the peak P1 and the peak P2 is suppressed to the target value TG. That is, a signal that is output from the adding unit 15 is a multicarrier signal with the peak suppressed.

Here, for example, the transmission baseband signal B1 that corresponds to the carrier $f_1$ with the frequency $f_1$ is described as "x(t)", and the transmission baseband signal B2 that corresponds to the carrier $f_2$ with the frequency $f_2$ as "y(t)".

Figure 2:
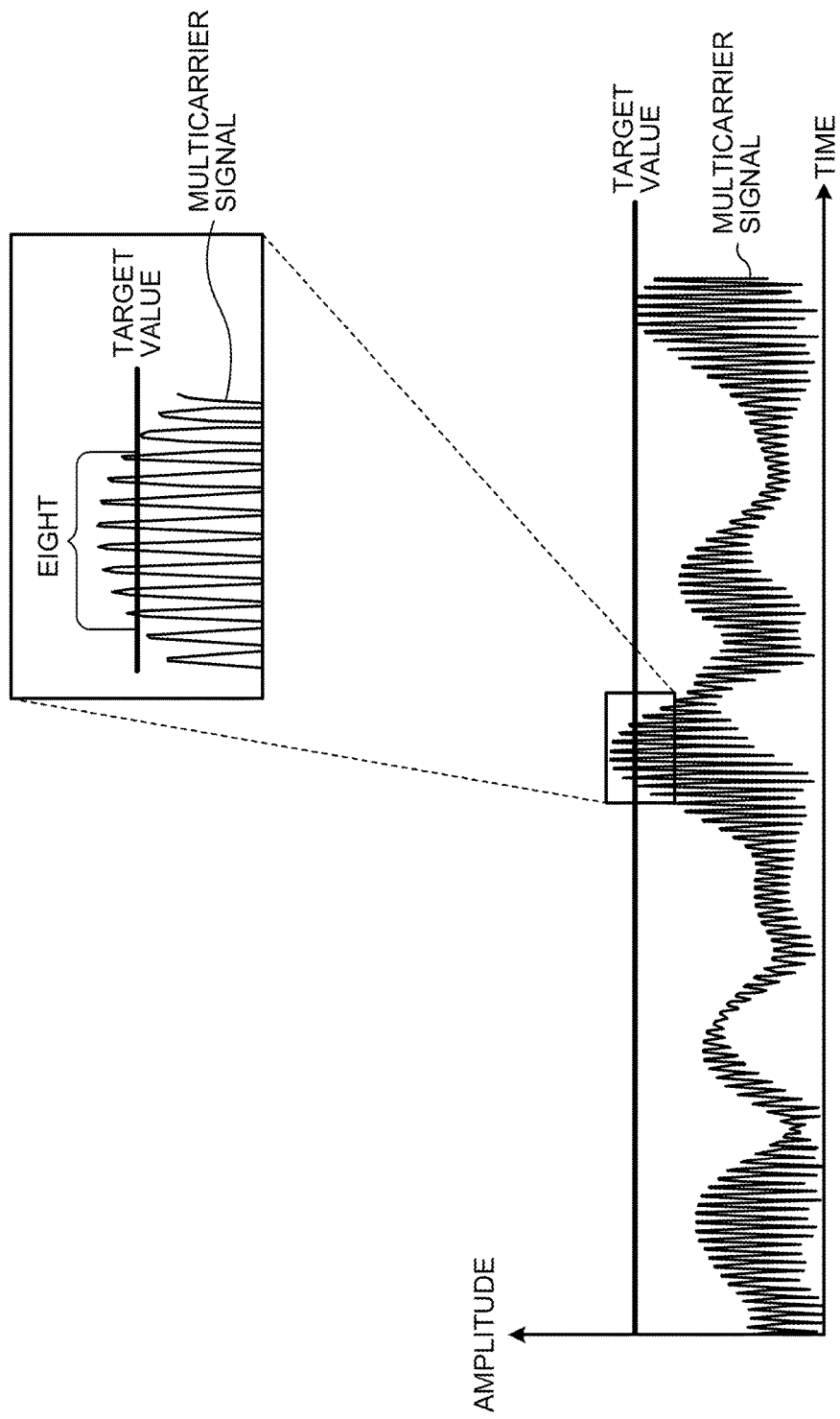
FIG. 2 is a diagram that illustrates a problem.

The combined signal that is obtained by directly adding the carrier signal C1 and the carrier signal C2, i.e., the combined signal with the remaining frequency shift component, is expressed by Equation (1). The combined signal that is expressed by Equation (1) corresponds to the multicarrier signal that is illustrated in FIG. 2. Specifically, the combined signal that is expressed by Equation (1) has the remaining frequency shift component, and therefore a small amplitude fluctuation of the signal in the direction of the time axis is sharp. Thus, the combined signal that is expressed by Equation (1) is conventionally used as a peak-detection signal.

$$\sqrt{(x(t)e^{j2\pi\Delta f_1 t} + y(t)e^{j2\pi\Delta f_2 t})^2} = \sqrt{x(t)^2 e^{j4\pi\Delta f_1 t} + y(t)^2 e^{j4\pi\Delta f_2 t} + 2x(t)y(t)e^{j2\pi(\Delta f_1 + \Delta f_2)t}} \quad (1)$$

Contrary to the above, the combined envelope that is obtained by adding the envelope EN1 of the carrier signal C1 and the envelope EN2 of the carrier signal C2 is expressed by Equation (2). The combined envelope that is expressed by Equation (2) corresponds to the combined envelope EN0 that is illustrated in FIG. 5. That is, the combined envelope that is expressed by Equation (2) is the signal that has a more moderate amplitude fluctuation in the direction of the time axis compared to the combined signal that is expressed by Equation (1). Thus, according to the first embodiment, the combined envelope that is expressed by Equation (2) is used as a peak-detection signal.

$$|x(t)| + |y(t)| \quad (2)$$

Operation of the Radio Transmission Device

Figure 6:
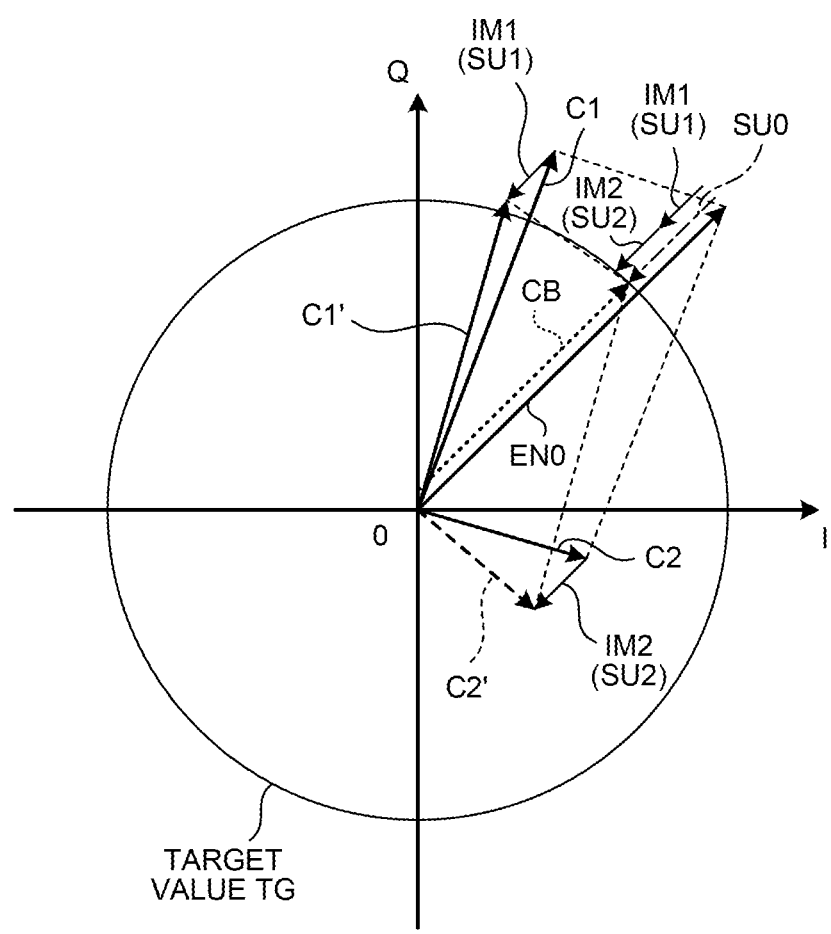
FIG. 6 is a diagram that illustrates processing of the radio transmission device according to the first embodiment.

FIG. 6 is a diagram that illustrates processing of the radio transmission device according to the first embodiment. In FIG. 6, each signal is represented as a vector.

First, the adding unit 23 combines the envelope EN1 of the carrier signal C1 and the envelope EN2 of the carrier signal C2, thereby obtaining the combined envelope EN0.

Next, the suppression-amount calculating unit 25 calculates, as the suppression amount SU0, the difference between the target value TG and the peak value that is larger than the target value TG among multiple peak values of the combined envelope EN0.

Next, the suppression-amount allocating unit 26 evenly allocates one-half of the suppression amount SU0 to each of the carrier signal C1 and the carrier signal C2.

Then, the impulse-response generating unit 27 outputs, to the subtracting units 13-1 and 13-2, the impulse response signals IM1 and IM2 that have the maximum amplitudes that are equivalent to the suppression amounts SU1 and SU2, respectively. Thus, the carrier signal C1' that is output from the frequency shifter 14-1 is the signal that is obtained by suppressing the amplitude of the carrier signal C1 by the suppression amount SU1. Similarly, the carrier signal C2' that is output from the frequency shifter 14-2 is the signal that is obtained by suppressing the amplitude of the carrier signal C2 by the suppression amount SU2.

Then, the adding unit 15 combines the carrier signal C1' and the carrier signal C2' to obtain the combined signal CB. Thus, the combined signal CB that is obtained by the adding unit 15 is a multicarrier signal on which the peak suppression has been conducted.

As described above, according to the first embodiment, the peak suppression device 7 includes the envelope acquiring units 22-1 and 22-2, the adding unit 23, the peak detecting unit 24, and the peak suppressing unit 5. The envelope acquiring units 22-1 and 22-2 acquire the envelopes EN1 and EN2 of the carrier signals C1 and C2 that are included in the multicarrier signal. The adding unit 23 adds the envelopes EN1 and EN2 to generate the combined envelope EN0. The peak detecting unit 24 uses the combined envelope EN0 to detect the peak value and the peak timing of the multicarrier signal. The peak suppressing unit 5 suppresses the peak of the multicarrier signal on the basis of the peak value and the peak timing that are detected.

Specifically, according to the first embodiment, the envelopes EN1 and EN2 of the carrier signals C1 and C2 are first acquired, and then the envelopes EN1 and EN2 are added to obtain the combined envelope EN0. Thus, the combined envelope EN0 has the waveform that is obtained by sequentially connecting the peak points of the multicarrier signal as illustrated in FIG. 2, whereby the number of peaks of the peak-detection signal can be reduced. Therefore, even if a multicarrier signal has multiple peaks that exceed the target value within a short time range as illustrated in FIG. 2, the peaks can be treated as a single peak, such as the peak P1 or the peak P2 that is illustrated in FIG. 5. Thus, even if a multicarrier signal has multiple peaks that exceed the target value within a short time range, the single optimum peak timing within the short time range can be detected. Thus, in accordance with various amplitude patterns of a multicarrier signal, the single optimum peak timing for applying an impulse response signal can be determined among multiple peak timings that correspond to multiple peaks that exceed the target value. Thus, according to the first embodiment, an operation to determine the optimum timing for applying an impulse response signal can be simplified, and therefore the size of the circuit of the radio transmission device can be reduced.

[b] Second Embodiment

As illustrated in FIG. 5, the amplitudes of the carrier signals C1 and C2 vary independently from moment to moment, and therefore the amplitude values of them at the peak timing are not always the same. Therefore, if the suppression amount is evenly allocated to each carrier signal as described in the first embodiment, the carrier signal with a small amplitude is largely suppressed, and the Error Vector Magnitude (EVM) of the carrier signal with the small amplitude is sometimes decreased. Thus, according to a second embodiment, a suppression amount is allocated to each carrier signal in accordance with the value of amplitude of each carrier signal.

Configuration of the Radio Transmission Device

Figure 7:
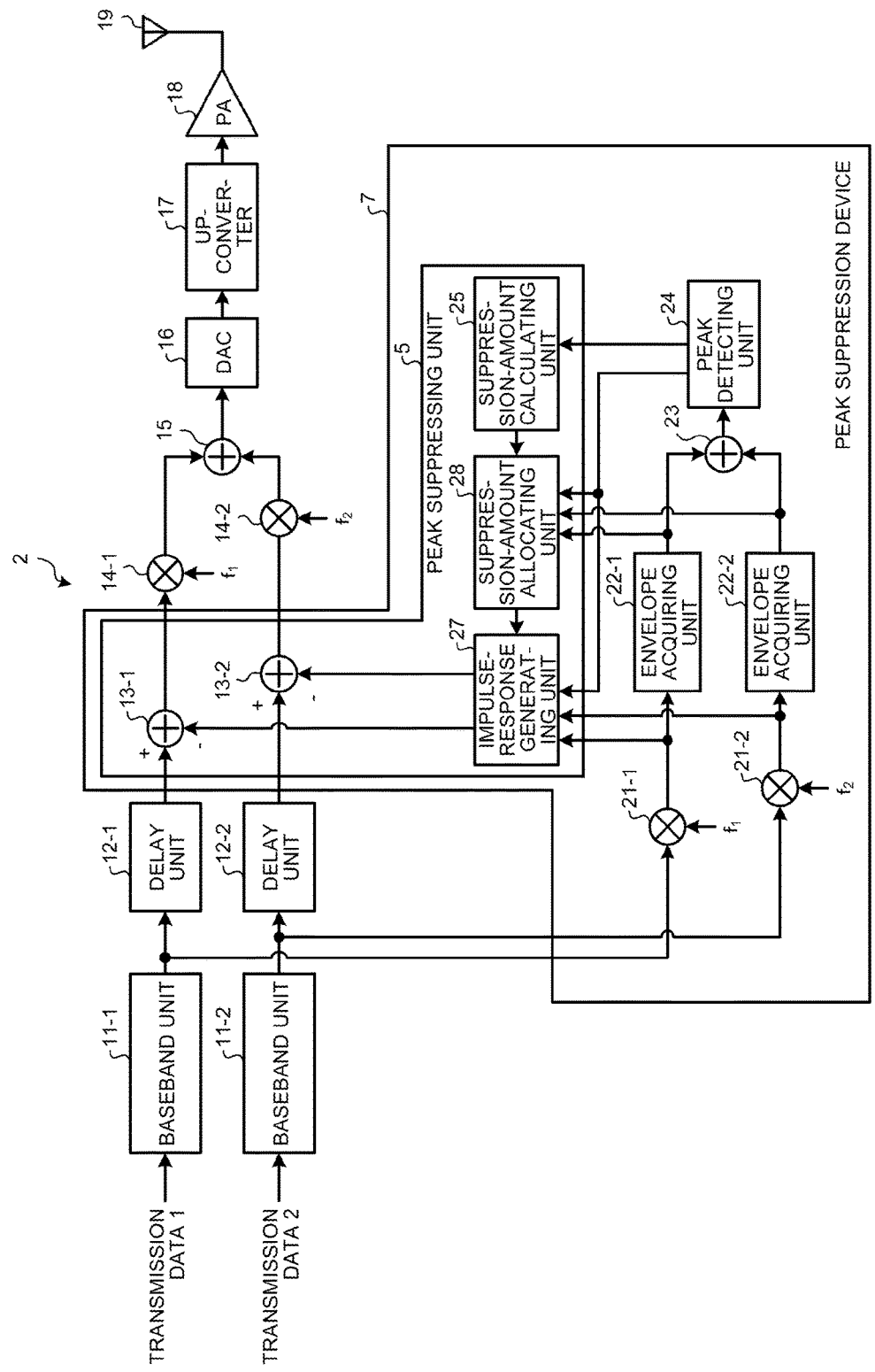
FIG. 7 is a block diagram that illustrates an example of the configuration of a radio transmission device according to a second embodiment.

FIG. 7 is a block diagram that illustrates an example of the configuration of a radio transmission device according to the second embodiment. In FIG. 7, a radio transmission device 2 includes the peak suppression device 7. The peak suppression device 7 includes the peak suppressing unit 5. The peak suppressing unit 5 includes the suppression-amount calculating unit 25, a suppression-amount allocating unit 28, the impulse-response generating unit 27, and the subtracting units 13-1 and 13-2. That is, the radio transmission device 2 includes the suppression-amount allocating unit 28 instead of the suppression-amount allocating unit 26 of the radio transmission device 1 (FIG. 3) according to the first embodiment.

The envelope acquiring unit 22-1 acquires the envelope EN1 of the carrier signal C1 and outputs the acquired envelope EN1 to the adding unit 23 and the suppression-amount allocating unit 28. The envelope acquiring unit 22-2 acquires the envelope EN2 of the carrier signal C2 and outputs the acquired envelope EN2 to the adding unit 23 and the suppression-amount allocating unit 28.

The peak detecting unit 24 uses the combined envelope EN0 as a peak-detection signal to detect the peak value and the peak timing of a multicarrier signal. The peak detecting unit 24 outputs the detected peak value to the suppression-amount calculating unit 25 and outputs the detected peak timing to the impulse-response generating unit 27 and the suppression-amount allocating unit 28.

The suppression-amount calculating unit 25 calculates the difference between the peak value and the target value as the suppression amount SU0 for the peak of the multicarrier signal and outputs the calculated suppression amount SU0 to the suppression-amount allocating unit 28.

The suppression-amount allocating unit 28 acquires an amplitude value $A_{EN1}$ of the envelope EN1 and an amplitude value $A_{EN2}$ of the envelope EN2 at the peak timing that is detected by the peak detecting unit 24. Then, the suppression-amount calculating unit 25 calculates the suppression amount SU1 for the carrier signal C1 and the suppression amount SU2 for the carrier signal C2 in accordance with, for example, Equations (3) and (4). The suppression-amount allocating unit 28 outputs the calculated suppression amounts SU1 and SU2 to the impulse-response generating unit 27. In Equations (3) and (4), "P" is the peak value that is detected by the peak detecting unit 24, and "TG" is the target value.

$$SU1 = (P-TG) \times (A_{EN1}/(A_{EN1}+A_{EN2})) \quad (3)$$

$$SU2 = (P-TG) \times (A_{EN2}/(A_{EN1}+A_{EN2})) \quad (4)$$

Specifically, the suppression-amount allocating unit 28 allocates, to the carrier signal C1, the suppression amount SU1 that is proportional to the amplitude value $A_{EN1}$ and allocates, to the carrier signal C2, the suppression amount SU2 that is proportional to the amplitude value $A_{EN2}$. Thus, the peak suppressing unit 5 suppresses the carrier signals C1 and C2 by using the suppression amounts SU1 and SU2 that are proportional to the amplitude values $A_{EN1}$ and $A_{EN2}$ of the envelopes EN1 and EN2.

Operation of the Radio Transmission Device

Figure 8:
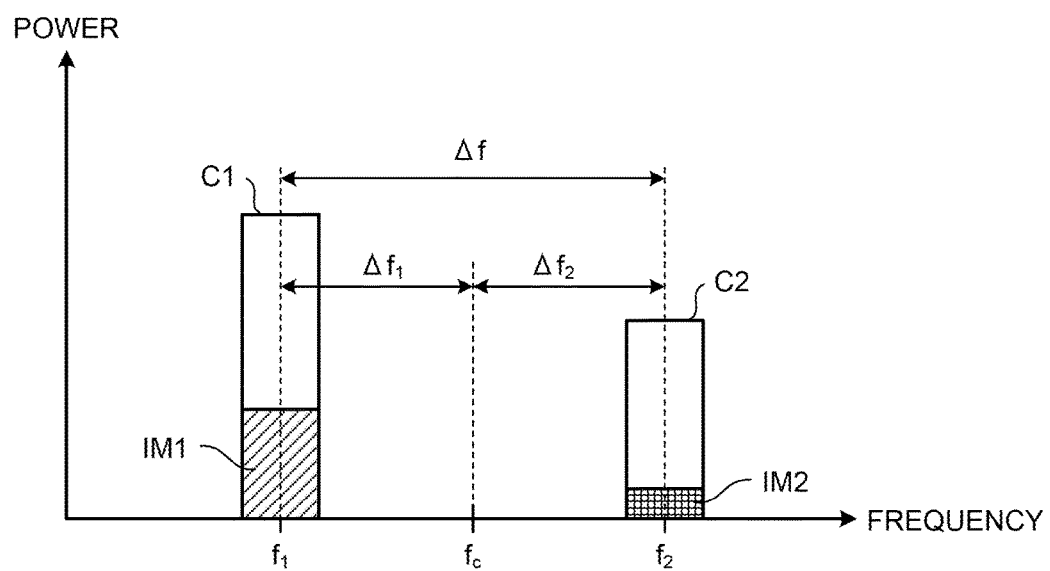
FIG. 8 is a diagram that illustrates an operation of the radio transmission device according to the second embodiment.
Figure 9:
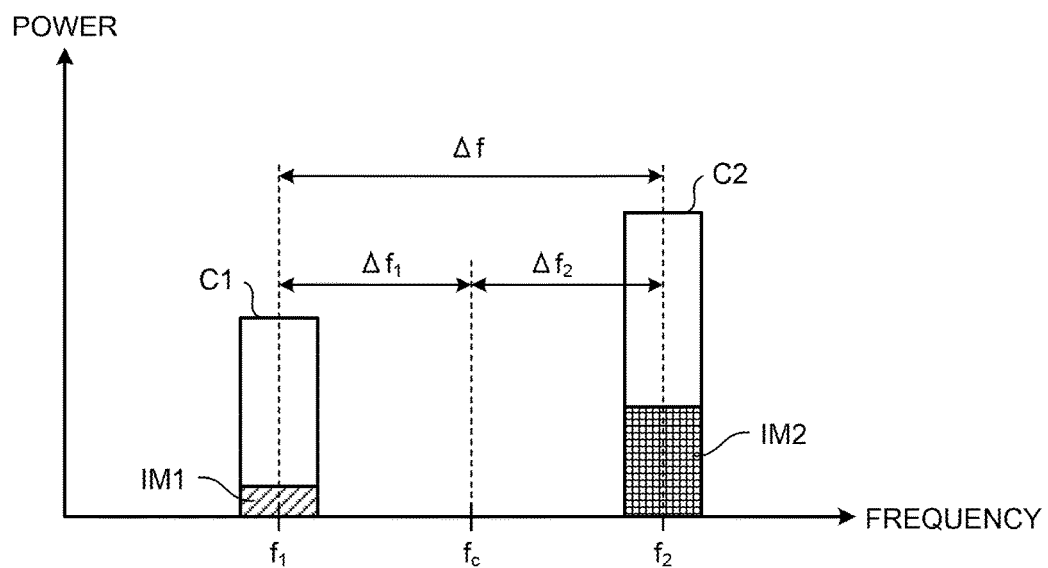
FIG. 9 is a diagram that illustrates an operation of the radio transmission device according to the second embodiment.

FIG. 8 and FIG. 9 are diagrams that illustrate an operation of the radio transmission device according to the second embodiment. As illustrated in FIGS. 8 and 9, according to the second embodiment, the amounts of power of the impulse response signals IM1 and IM2 for suppressing the carrier signals C1 and C2 are changed in accordance with the amounts of power of the carrier signals C1 and C2. That is, as a carrier signal has a smaller amplitude, it is suppressed with a smaller suppression amount.

Operation of the Radio Transmission Device

Figure 10:
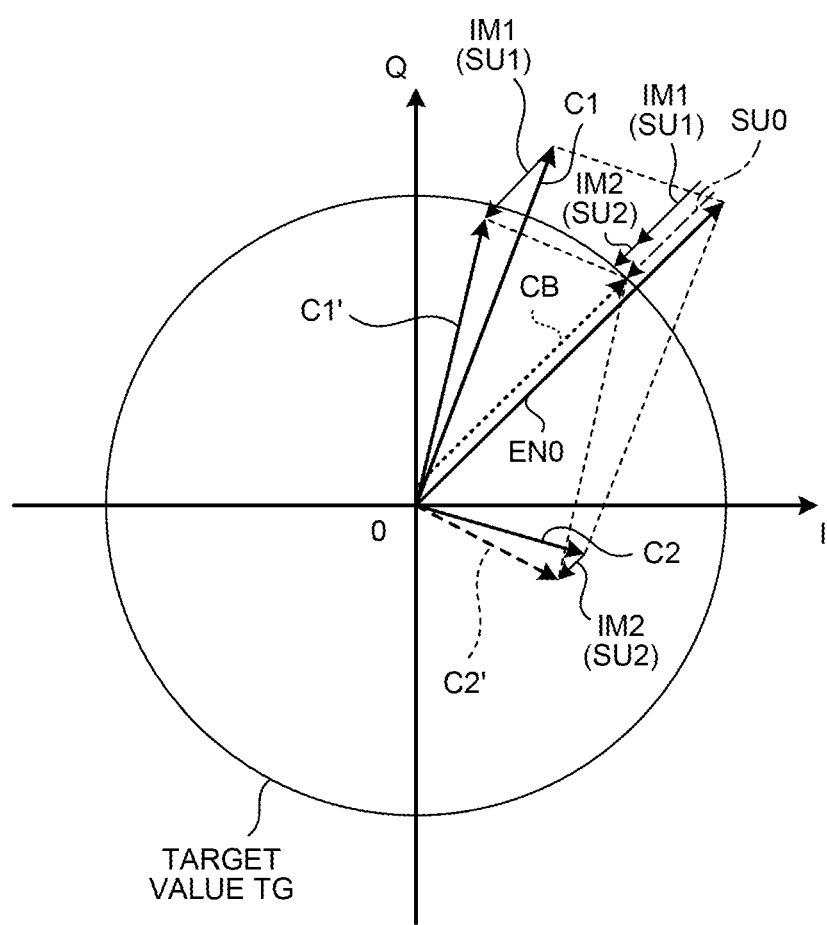
FIG. 10 is a diagram that illustrates processing of the radio transmission device according to the second embodiment.

FIG. 10 is a diagram that illustrates processing of the radio transmission device according to the second embodiment. In FIG. 10, each signal is represented as a vector. Hereafter, explanations are omitted for the operation that is the same as the operation according to the first embodiment (FIG. 6).

The suppression-amount allocating unit 28 allocates the suppression amount SU0 to the carrier signal C1 and the carrier signal C2. For example, the suppression amount SU1 for the carrier signal C1 is calculated by using Equation (3), and the suppression amount SU2 for the carrier signal C2 is calculated by using Equation (4). FIG. 10 illustrates a case where the amplitude of the carrier signal C2 is smaller than the amplitude of the carrier signal C1.

As described above, according to the second embodiment, the peak suppressing unit 5 suppresses the carrier signals C1 and C2 by using the suppression amounts SU1 and SU2 that are proportional to the amplitude values $A_{EN1}$ and $A_{EN2}$ of the envelopes EN1 and EN2, thereby suppressing the peak of the multicarrier signal.

Thus, the decrease of the EVM due to peak suppression can be prevented.

Here, the amplitude value that is used in Equations (3) and (4) may be a momentary value or may be an average value within a predetermined time period.

Heretofore, the first embodiment and the second embodiment have been explained.

[c] Other Embodiment

[1] The impulse-response generating unit 27 may directly generate an impulse response signal or may conduct band limitation on the generated impulse signal by using a band-limiting filter and use the signal as an impulse response signal.

[2] The peak suppression device 7 is implemented as hardware by using, for example, a field programmable gate array (FPGA), a large scale integrated circuit (LSI), or a processor. Examples of the processor include a central processing unit (CPU) or a digital signal processor (DSP). Furthermore, the peak suppression device 7 may include a memory.

According to the disclosed aspect, it is possible to reduce the size of the circuit of a radio transmission device that conducts peak suppression on a multicarrier signal.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A peak suppression device using an impulse signal for a multicarrier signal, the peak suppression device comprising:

a memory; and a processor configured to be coupled to the memory, wherein the processor executes a process comprising:

acquiring a first envelope and a second envelope of a first carrier signal and a second carrier signal that are included in the multicarrier signal, the first envelope corresponding to the first carrier signal and the second envelope corresponding to the second carrier signal;

adding the first and second envelopes to generate a combined envelope;

detecting peak timings from consecutive peaks larger than a target value by using the combined envelope, the consecutive peaks being generated by the multicarrier signal;

calculating a difference value between an amplitude value at each of the detected peak timings and the target value;

generating first and second impulse signals depending on the difference value, the first impulse signal being adjusted for a phase according to the first carrier signal, the second impulse signal being adjusted for a phase according to the second carrier signal; and suppressing the first carrier signal using the first impulse signal and suppressing the second carrier signal using the second impulse signal.

* * * * *